United States Patent
Hosoyama et al.

[11] Patent Number: 5,475,036
[45] Date of Patent: Dec. 12, 1995

[54] PROCESS FOR REUSING PLASTIC ARTICLES WITH COATINGS

[75] Inventors: Hiroshi Hosoyama; Michiaki Yamamoto, both of Hiroshima; Keigo Suehiro, Tokyo, all of Japan

[73] Assignees: The Japan Steel Works, Ltd.; Mitsui Toatsu Chemicals, Inc., both of Tokyo, Japan

[21] Appl. No.: 8,285

[22] Filed: Jan. 25, 1993

[30] Foreign Application Priority Data

Jan. 27, 1992 [JP] Japan .................... 4-011968
Dec. 21, 1992 [JP] Japan .................... 4-340669

[51] Int. Cl.⁶ .................... C08J 11/04; B29B 17/00
[52] U.S. Cl. .................... 521/40; 521/40.5; 521/44; 521/45; 521/46; 521/46.5; 521/48; 521/48.5
[58] Field of Search .................... 521/40, 40.5, 44, 521/46, 46.5, 48, 48.5, 45

[56] References Cited

U.S. PATENT DOCUMENTS 4,324,705  4/1982  Seto et al. .................... 521/40
4,981,876  1/1991  Grimmer .................... 521/45

FOREIGN PATENT DOCUMENTS 0255129  10/1989  European Pat. Off. .
0468375  1/1992  European Pat. Off. .................... 521/40

OTHER PUBLICATIONS

Patent Abstracts of Japan vol. 5, No. 193 (M–101) (865) Dec. 9, 1981 (JPA 56–115214).
Patent Abstracts of Japan vol. 6, No. 105 (M–136) Jun. 15, 1982 (JPA 57–036013).
Nissan Technology Newsline Sep. 1991, "Nissan Takes On Plastic Recycling Challenger" Bryan Harrell.

*Primary Examiner*—Paul R. Michl
*Assistant Examiner*—Olga Asinovsky
*Attorney, Agent, or Firm*—Sughrue, Mion, Zinn, Macpeak & Seas

[57] ABSTRACT

A process for reusing a plastic article having a plastic body and a coating layer is discloses which includes the following steps: peeling the coating layer, formed on the plastic body, away from the plastic body by using a high pressure water jet stream; and pulverizing the plastic body for reuse. Hot water may be also used. Instead of the water, it is possible to use high pressure steam.

6 Claims, 1 Drawing Sheet

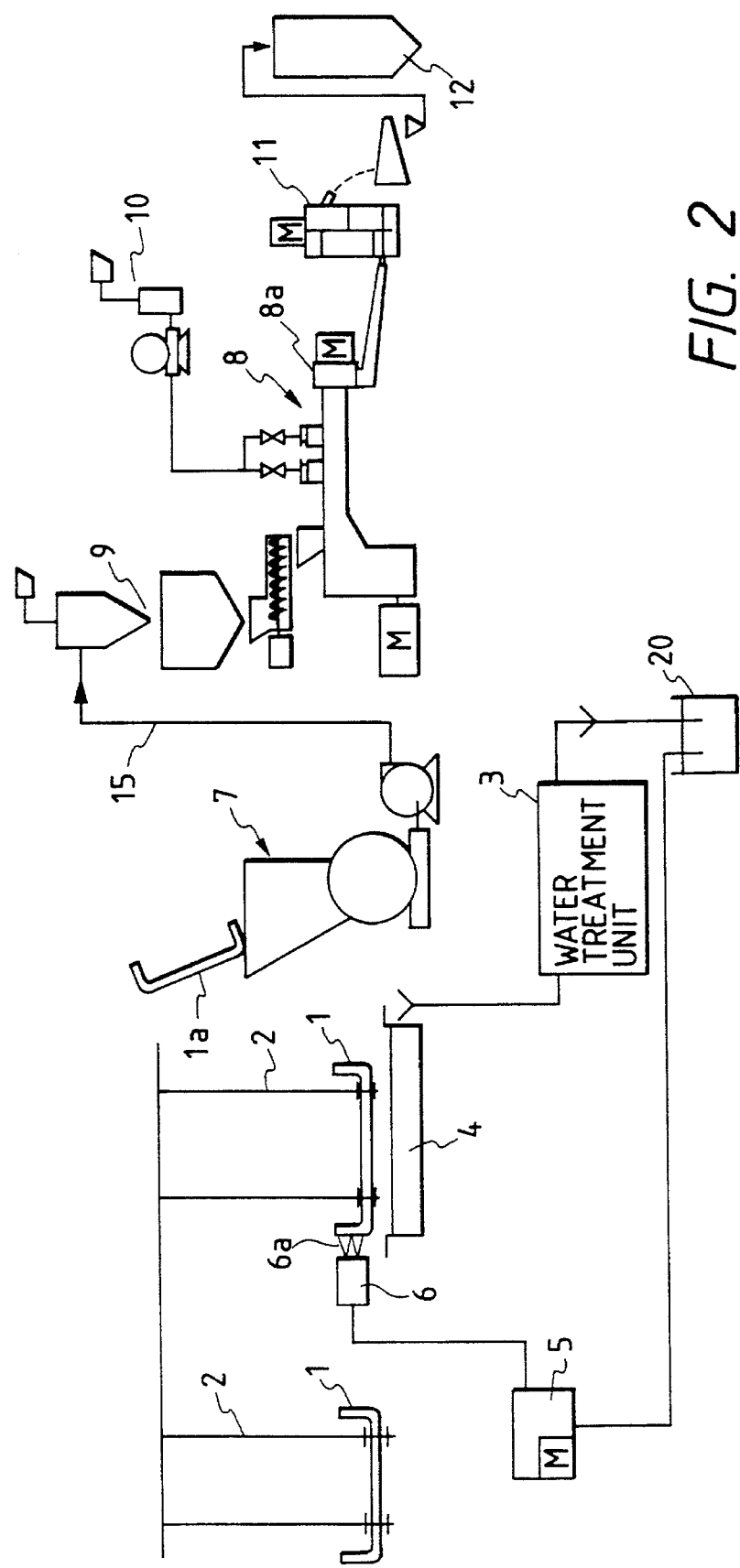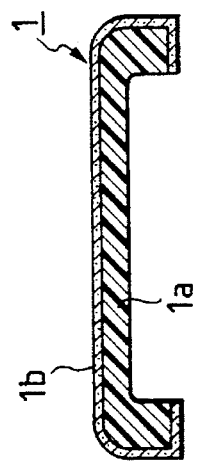

PROCESS FOR REUSING PLASTIC ARTICLES WITH COATINGS

BACKGROUND OF THE INVENTION

The present invention relates to a process for reusing plastic articles with coatings, and more particularly to an improvement in a process for reusing plastic articles from which coatings are peeled apart by using a high pressure water jet stream. For reusing the plastics, the plastic articles are to be pulverized.

Conventionally, plastic articles with coatings have been pulverized by a pulverizing machine without peeling off the their coatings, and the pulverized plastics are molded by injection molding machines or press molding machines for reuse articles.

It has been proposed to reuse the plastic articles after coatings are removed therefrom. Recently, some methods for peeling the coatings with organic solvent have been proposed. For instance, the plastic articles with coating layers are pulverized; the pulverized articles are dipped into a solvent tank filled with organic salts or the like; only the plastic components are removed by a separator; and further after washing and drying, the articles are pelletized by an extruder for reuse.

However, the convention reuse methods suffer from the following disadvantages:

(1) In the former conventional case, since the coating material and the plastics are mixed with each other, the coating material would affect adversely the reuse articles to degrade the quality of the articles. The coating pieces contained in the reused articles will reside therein as inpurities, resulting in degradation of the material strength. Also, the coating pieces are irregularly dispersed on the surface of the articles, which degrade the aesthetic appearance thereof. The use thereof is largely limited to, for instance, benches in a public park, fences or blocks for pavements, or the like. It would be impossible to use the reuse article without limitation.

(2) In the latter conventional case, since organic salts or the like are used, if the used solvent would be disposed without any treatment, a problem of public pollution would be raised. It is therefore necessary to make it innoxious. However, this causes an unduly high cost. Also, water to be used for washing must be kept harmless, which needs a large-scale system for such an innocuous property.

(3) The coating material is readily separated from the plastic pieces in the solvent. It is however very difficult to accurately remove the plastic pieces from the solvent. It is inevitable for the final articles to contain the coating material, which would lead to the degradation in quality of the reuse articles.

As mentioned above, the reuse plastics may be used only for articles which might be classified in a low level in quality.

SUMMARY OF THE INVENTION

An object of the invention is to provide a process for reusing plastic articles by removing coatings thereon with high pressure water jet streams.

This and other objects may be attained by providing a process for reusing a plastic article having a plastic body and a coating layer, comprising the following steps: peeling the coating layer, formed on the plastic body, away from the plastic body by using a high pressure water jet stream; and pulverizing the plastic body for reuse.

According to the invention, the plastic body from which the coating layer has been removed and which has been pulverized is kneaded and made into pellets by using an extruder.

The process may further comprise the step of forming scratches on the coating layer before the peeling of the coating layer.

The plastic article may comprise an automotive thermoplastic bumper.

The high pressure water jet stream is preferably kept at a temperature not less than 55° C.

According to another aspect of the invention, there is provided a process for reusing a plastic article having a plastic body and a coating layer, comprising the following steps: peeling the coating layer, formed on the plastic body, away from the plastic body by using a steam; and pulverizing the plastic body for reuse.

BRIEF DESCRIPTION OF THE DRAWINGS

In the accompanying drawings:

FIG. 1 is a schematic view showing an apparatus which embodies a process for reusing plastic articles with coatings according to the invention; and FIG. 2 is a cross-sectional view showing an automotive bumper used in the apparatus shown in FIG. 1.

DESCRIPTION OF THE PREFERRED EMBODIMENTS

The invention will now be described with reference to the accompanying drawings.

FIG. 1 shows an apparatus for embodying a process of the present invention for plastic articles. In the preferred embodiment, the plastic articles are automotive bumpers but it is apparent that the application of the invention is not limited thereto. FIG. 2 shows an automotive bumper in cross section.

In FIG. 1, collected automotive bumpers 1 are delivered one by one by suspended carriers 2. The bumpers have plastic bodies 1a made of polypropylene and coating layers 1b on the bodies, as shown in FIG. 2. The bumper is located above a water bath 4 connected to a water treatment unit 3 and under this condition, the bumper takes a position to face nozzles 6 connected to a high pressure water jet stream generator 5.

A pulverizer 7 and a twin screw extruder 8 are located downstream of the water bath 4. The pulverizer 7 and the twin screw extruder 8 are connected to each other through a supply means 15. A vacuum pump 10 and a drier 11 are connected to the twin screw extruder 8.

The operation of the thus constructed system will be explained for reusing the automotive bumpers.

The coating layer 1b of the bumper which has been delivered by the carrier 2 is subjected in advance to some treatments such as hammering, wire-brushing or sandblasting to form scratches. Then, the coating surface of the bumper is subjected to a strong water jet stream 6a at a high pressure by the nozzles 6 above the water bath 4. The supply of the high pressure water jet stream 6a causes the coating layer 1b to be peeled off the plastic body 1a and to fall down to the water bath 4. Thus, the coating layer 1b is removed and collected by the water treatment unit 3. The water from which coatings or solid substances have been removed is re-used for the high pressure water jet stream through a water bath 20.

The plastic body 1a from which the coating layer has been removed is pulverized by the pulverizer 7 and is fed to a feeder 9 of the twin screw extruder 8. The plastic material is kneaded within the twin screw extruder 8, and is cut into pellets by the pelletalizer 8a. The pellets are dried by the drier 11.

The dried pellets (not shown) are fed into the tank or bath 12 and stored therein.

The experiments conducted by the inventors will be explained.

EXAMPLE 1

The bumper 1 was made of polypropylene with the urethane coating layer 1b (having a thickness of about 40 to 70 micron meters). The water jet stream kept at a pressure of 100 to 2,000 kg/cm$^2$G (at outlets of the pump) was applied from the nozzles 6 to the bumper by 20 to 40 mm apart from the surface of the coating layer 1b. As the best modes, the jet stream kept at about 120 to 300 kg/cm$^2$G was applied to the bumper, as a result of which it was possible to peel the coating layer in several seconds after the application of the jet stream. The amount of water was 13 liters/minute. A sector angle of the spray of the jet stream 6a was 25°.

Below the pressure of 100 kg/cm$^2$G of the high pressure jet stream 6a, it was impossible to ensure a satisfactory effect of peeling even if the nozzles 6 were caused to approach the coating layer 6b. Inversely, if the pressure would exceed 2,000 kg/cm$^2$G, there would be a problem to obtain an actual pump. As a results of the experiments, it has been found that a large amount of water is needed for the jet stream at a low pressure and the amount of water may be saved as the pressure is increased.

In the experiments described above, the water from a water service was used as a high pressure water.

EXAMPLE 2

Hot water kept above 55° C. was used instead of water kept at room temperature to thereby soften the coating layer and to increase a rate of peeling. In the same way as in the preceding example, the bumper 1 was made of polypropylene. The water jet stream kept at a pressure of 300 kg/cm$^2$G was applied from the nozzles 6 to the bumper by 30 mm apart from the surface of the coating layer 1b. The amount of water was 13 liters/minute. An sector angle of the spray of the jet stream 6a was 25°.

In this example, the same conditions as those of Example 1 were used except for the temperature of the water. In Example 1, the peeling rate was 300 cm/min. by using the water but in Example 2, the temperature of water was changed at 50°, 60° and 70° C. for confirming the peeling rate. As a result, at the temperature of 50° C., the peeling rate was 300 cm/min. which was the same as that in Example 1. At the temperature of 60° C., the peeling rate was 1,320 cm/min. Subsequently, at the temperature of 70° C., the peeling rate was 1,320 cm/min. In order to confirm the critical point of the peeling temperature, the temperature of water was changed gradually from 51° C. It was found that the critical point of the peeling temperature was 55° C. in comparison with Example 1.

Thus, the use of water kept at 55° C. may increase the peeling rate 4.4 times higher than that of the water at room temperature. This is economically advantageous. It is possible to use steam instead of the water. Also, the invention may be applied to other plastic material such as thermosetting urethane.

As mentioned above, according to the present invention, the following advantages are enjoyed. Namely, it is possible to easily peel the coating layer by using water at room temperature or at a slightly high temperature or high temperature steam. High quality reuse plastics may be obtained, which is impossible in the prior art. Thus, the recycle of plastics may be greatly improved.

What is claimed is:

1. A process for reusing a plastic article having a plastic body and a coating layer; comprising the following steps:

delivering collected plastic articles one by one using suspended carriers;

locating the plastic articles above a water bath connected to a water treatment unit;

peeling the coating layer, formed on the plastic body, away from the plastic body by using a high pressure water jet stream; and pulverizing the plastic body for reuse.

2. The process according to claim 1, wherein the plastic body from which the coating layer has been removed and which has been pulverized is kneaded and made into pellets by using an extruder.

3. The process according to claim 1, further comprising the step of forming scratches on the coating layer before said peeling of the coating layer.

4. The process according to claim 1, wherein said plastic article comprises an automotive thermoplastic bumper.

5. The process according to claim 1, wherein said water jet stream is kept at a temperature not less than 55° C.

6. A process for reusing a plastic article having a plastic body and a coating layer, comprising the following steps:

peeling the coating layer, formed on the plastic body, away from the plastic body by using a steam; and pulverizing the plastic body for reuse.

\* \* \* \* \*